US010084742B2

(12) United States Patent
Lewis et al.

(10) Patent No.: US 10,084,742 B2
(45) Date of Patent: Sep. 25, 2018

(54) SOCIAL MEDIA THREAT MONITOR

(71) Applicant: iThreat Cyber Group Inc., Princeton, NJ (US)

(72) Inventors: Michael A. Lewis, Stroudsburg, PA (US); Jeffrey R. Bedser, Hamilton Square, NJ (US); Jeffrey Pinyan, Ewing, NJ (US)

(73) Assignee: ITHREAT CYBER GROUP INC., Princeton, NJ (US)

( * ) Notice: Subject to any disclaimer, the term of this patent is extended or adjusted under 35 U.S.C. 154(b) by 138 days.

(21) Appl. No.: 14/629,820

(22) Filed: Feb. 24, 2015

(65) Prior Publication Data

US 2016/0248720 A1    Aug. 25, 2016

(51) Int. Cl.
*G06F 15/16* (2006.01)
*H04L 12/58* (2006.01)

(52) U.S. Cl.
CPC .............. *H04L 51/32* (2013.01); *H04L 51/12* (2013.01)

(58) Field of Classification Search
CPC ...................................................... H04L 51/32
See application file for complete search history.

(56) References Cited

U.S. PATENT DOCUMENTS

| | | | | |
|---|---|---|---|---|
| 8,666,821 B2* | 3/2014 | Xie | .................. | G06Q 30/02 |
| | | | | 705/14.54 |
| 9,203,915 B2* | 12/2015 | Orioli | .................. | H04L 67/22 |
| 9,223,971 B1* | 12/2015 | Bartolomie | ............ | G06F 21/56 |
| 9,652,551 B2* | 5/2017 | Ingoldby | ............ | G06F 17/3089 |
| 2010/0121707 A1* | 5/2010 | Goeldi | .................. | G06Q 10/00 |
| | | | | 705/14.49 |
| 2014/0304343 A1* | 10/2014 | Skiba | .................. | H04M 3/5175 |
| | | | | 709/206 |
| 2014/0325662 A1* | 10/2014 | Foster | .................. | H04L 63/20 |
| | | | | 726/25 |

\* cited by examiner

*Primary Examiner* — Brian Whipple
(74) *Attorney, Agent, or Firm* — Moritt Hock & Hamroff LLP; Bret Paul Shapiro

(57) ABSTRACT

Technologies are generally described for systems, devices and methods effective to generate a report related to an entity. An identifier may be received from a computing device. The identifier may identify the entity. A keyword may be received from the computing device. A first social media post that includes the identifier may be identified. An association between a user that generated the first social media post and the entity may be identified. A second social media post generated by the user may be identified. A determination may be made whether the second social media post includes the keyword. A report may be generated based on a determination that the second social media post includes the keyword.

18 Claims, 3 Drawing Sheets

SOCIAL MEDIA THREAT MONITOR

BACKGROUND

Unless otherwise indicated herein, the materials described in this section are not prior art to the claims in this application and are not admitted to be prior art by inclusion in this section.

Users of social media may post various information through services offered by social media companies. For example, a user may post information related to past, present, or future activities which may be engaged in by the user and/or others. Users may post pictures, videos and/or other content on social media. Users may associate with other users, such as by, for example, replying to one another's posts or commenting on posted content. Some information posted on social media may be publically available.

SUMMARY

In some examples, methods to generate a report related to an entity are generally described. In various examples, the methods may include receiving an identifier from a computing device. In some examples, the identifier may identify the entity. In further examples, the methods may further include receiving a keyword from the computing device. In some other examples, the methods may further include identifying a first social media post that includes the identifier. In other examples, the methods may further include identifying an association between a user that generated the first social media post and the entity. In various examples, the methods may further include identifying a second social media post generated by the user. In further examples, the methods may include determining whether the second social media post includes the keyword. In various other examples, the methods may further include generating a report based on a determination that the second social media post includes the keyword.

In some other examples, monitor devices are generally described. In some examples, the monitor devices may include a social media threat monitor unit and a memory effective to be in communication with the social media threat monitor unit. In some other examples, the social media threat monitor unit may be effective to receive an identifier from a computing device. In various examples, the computing device may be related to an entity. In some examples, the identifier may identify the entity. In some other examples, the social media threat monitor unit may be further effective to receive a keyword from a computing device. In various other examples, the social media threat monitor unit may be further effective to identify a first social media post that includes the identifier. In various examples, the social media threat monitor unit may be further effective to identify an association between a user that generated the first social media post and the entity. In some examples, the memory may be effective to store the keyword, the identifier, and the association in a database. In various examples, the social media threat monitor unit may be further effective to identify a second social media post generated by the user. In some other examples, the social media threat monitor unit may be further effective to determine whether the second social media post includes the keyword. In other examples, the social media threat monitor unit may be further effective to generate a report based on a determination that the second social media post includes the keyword.

In various other examples, social media monitor systems are generally described. In some examples, the social media monitor systems may include a social media threat monitor unit. In other examples, the social media monitor systems may include a memory effective to be in communication with the social media threat monitor unit. In other examples, the social media monitor systems may include a computing device related to an entity. In various examples, the computing device may be effective to be in communication with the social media threat monitor unit. In some examples, the computing device may be effective to send an identifier to the social media threat monitor unit. In some examples, the identifier may identify the entity. In some other examples, the computing device may be further effective to send a keyword to the social media threat monitor unit. In various examples, the social media threat monitor unit may be effective to receive the identifier from the computing device. In various other examples, the social media threat monitor unit may be effective to receive the keyword from the computing device. In other examples, the social media threat monitor unit may be effective to identify a first social media post that includes the identifier. In still other examples, the social media threat monitor unit may be further effective to identify an association between a user that generated the first social media post and the entity. In some examples, the memory may be effective to store the keyword, the identifier, and the association in a database. In some examples, the social media threat monitor unit may be further effective to identify a second social media post generated by the user. In some examples, the social media threat monitor unit may be further effective to determine whether the second social media post includes the keyword. In various other examples, the social media threat monitor unit may be further effective to generate a report based on a determination that the second social media post includes the keyword. In other examples, the social media threat monitor unit may be further effective to send the report to the computing device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
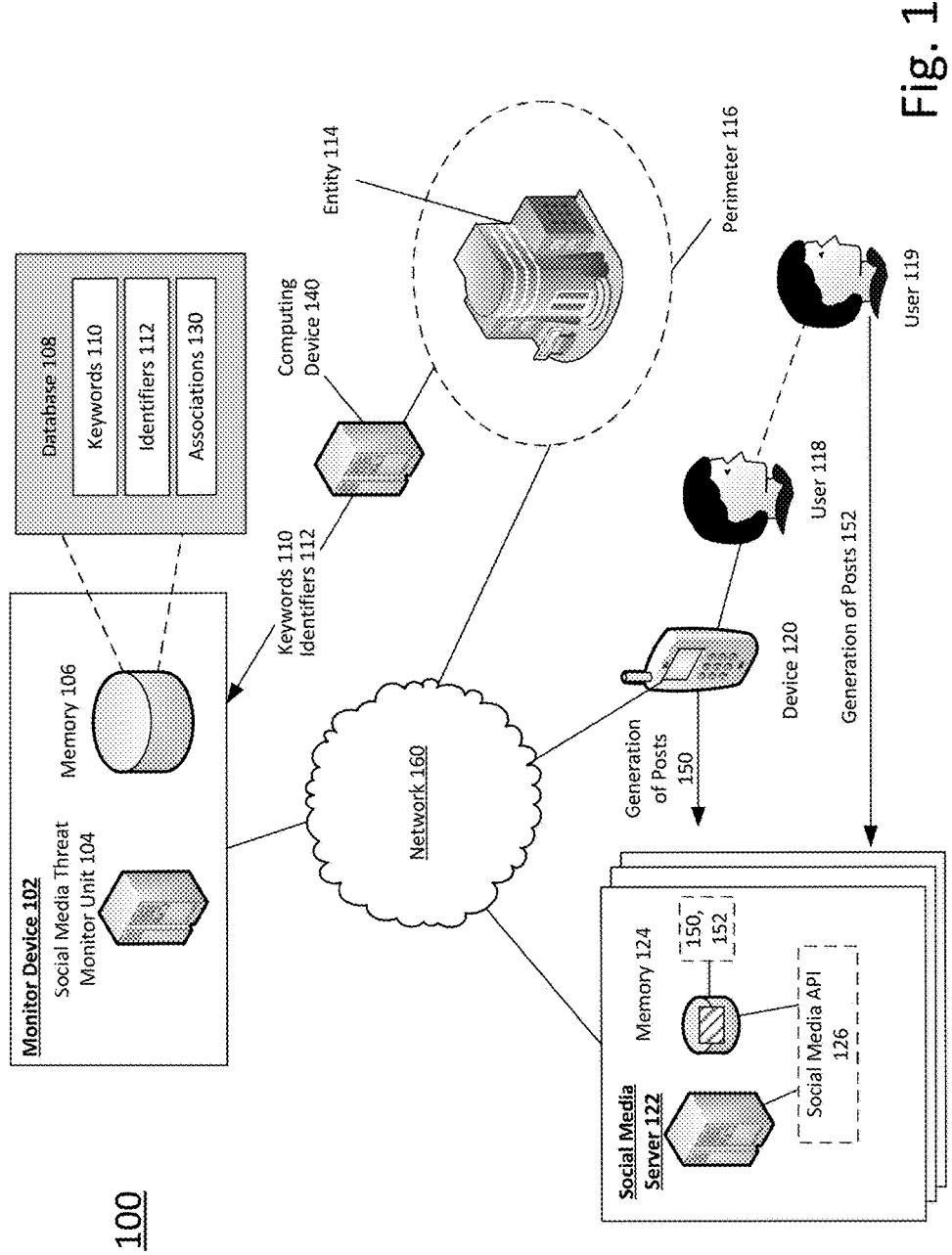
FIG. 1 illustrates an example system that can be utilized to implement a social media threat monitor.

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 illustrates an example system 100 that can be utilized to implement a social media threat monitor, arranged in accordance with at least some embodiments described herein. In some examples, system 100 may include a monitor device 102 effective to be in communication with one or more computing devices 140. In some examples, computing devices 140 may be associated with an entity 114. Monitor device 102 may be configured to be in communication with a social media server 122. In some examples, monitor device 102 may be effective to communicate with social media server 122 and/or computing device 140 over a network 160. Network 160 may be, for example, the Internet or another network through which various devices may communicate. Social media server 122 may be, for example, one or more computing devices which may host one or more social media websites. Examples of social media websites may include FACEBOOK, TWITTER, INSTAGRAM, PINTEREST, etc. Monitor device 102 may include a social media threat monitor unit 104 effective to be in communication with a memory 106. As will be discussed in further detail below, memory 106 may include a database 108. Database 108 may be, for example, a data structure effective to store information.

In some examples, entity 114, or a person associated with entity 114, may use monitor device 102 to monitor social media server 122 for potential threats to entity 114. In some examples, potential threats to entity 114 may be displayed on various social media services as posts 150, 152. Entity 114 may be, for example, one or more buildings and/or locations. In some examples, locations and/or buildings of entity 114 may be associated with institutions such as schools, public offices, businesses, etc. Examples of potential threats may include damage to property associated with entity 114, unlawful or harmful activity directed toward entity 114, or threats to employees, students, and/or other people associated with entity 114. Computing device 140 may be a device associated with, related to, controlled by, and/or operated by entity 114. Monitor device 102 may receive keywords 110 provided by computing device 140. Keywords 110 may be terms related to potential threats, which may be of interest to a person associated with entity 114. In an example, computing device 140 may provide keywords 110 such as: "kill", "bomb", "rape", "gun", etc., to monitor device 102.

Monitor device 102 may receive identifiers 112 from computing device 140. Identifiers 112 may be terms associated with entity 114. In some examples, identifiers 112 may be effective to identify entity 114 from among other entities. In some examples, identifiers 112 may include a name, an address and/or a location of entity 114. For example, if entity 114 is a school named "Whizkids School for Excellence" located at 400 Park Place, identifiers 112 may include terms such as: "400 Park Place", "Whizkids", "School for Excellence", "WSE", etc. Social media threat monitor unit 104 of monitor device 102 may receive keywords 110 and identifiers 112. Social media threat monitor unit 104 may store keywords 110 and identifiers 112 in database 108.

User 118 may be a user or subscriber of a social media website provided by social media server 122. In some examples, user 118 may send content to social media server 122. Content may be displayed on social media server 122 as posts 150. In some examples, posts 150 may include activities related to user 118, pictures, videos, or comments made by user 118. In some examples, user 118 may operate device 120 to generate posts 150. Device 120 may be, for example, a computing device such as a mobile cellular device, a laptop, personal digital assistant, tablet computer, smart device, or other computing device. In some examples, device 120 may send posts 150 to social media server 122 over network 160. In some examples, posts 150 may be stored on a memory 124 associated with social media server 122.

Social media threat monitor unit 104 may monitor posts 150 for the occurrence of keywords 110 and/or identifiers 112. Social media threat monitor unit 104 may identify particular posts 150 which include one or more of identifiers 112. In some examples, social media threat monitor unit 104 may use an application programming interface (such as Social Media API 126) of social media server 122 to monitor posts 150. Social media API 126 may be, for example, a set of protocols and instructions which may allow social media threat monitor unit 104 to communicate with social media server 122 in order to search posts 150 for keywords 110 and/or identifiers 112.

In some examples, social media threat monitor unit 104 may form associations 130 based on posts 150 which include identifiers 112. For example, social media threat monitor unit 104 may identify a particular association 130 between user 118 and entity 114 in response to post 150 generated by user 118 including one or more identifiers 112. In some examples, user 118 may generate post 150 for social media server 122. Post 150 may read: "First day of school at Whizkids!", where "Whizkids" is one of identifiers 112 and where Whizkids School for Excellence corresponds to entity 114. Social media threat monitor unit 104 may form association 130, which may correlate user 118 to Whizkids School for Excellence and therefore to entity 114. In some other examples, an indication of associations 130 between entity 114 and various people or organizations may be provided to social media threat monitor unit 104. For example, entity 114 may provide a list of users 118 (e.g. employees) who may have associations 130 with entity 114. In some examples, users 118 with associations 130 to entity 114 may have identifiers 112 which may be based on the nature of the particular user's relationship to entity 114. For example, employees of entity 114 may have identifiers 112 which may include terms such as: "job", "work", "boss", "warehouse", etc.

Social media threat monitor unit 104 may monitor or identify posts 150 of users 118 with association 130 to entity 114. For example, social media threat monitor unit 104 may monitor posts 150 for the occurrence of identifiers 112 and/or keywords 110. As will be discussed in further detail below, if social media threat monitor unit 104 determines that a particular keyword 110 is included in a post from a user with association 130 to entity 114, social media threat monitor unit 104 may generate a report and send the report to computing device 140, entity 114, and/or a person associated with entity 114. In various examples, social media threat monitor unit 104 may restrict monitoring activity to those posts of users who are associated to entity 114 by association 130.

In some examples, entity 114, or a person associated with entity 114, may provide an indication of a perimeter 116 to monitor device 102. Perimeter 116 may enclose a physical area which may surround one or more locations associated with entity 114. For example, if entity 114 is a university, perimeter 116 may surround the campus of the university. Perimeter 116 may be represented by map coordinates or other data. In various examples, posts 150 may include geotag metadata. Geotag metadata may indicate the location of device 120 during generation of a particular post 150. In some examples, identifier 112 may include geotag metadata. For example, if geotag metadata of post 150 indicates that the particular post was generated within a location bounded by perimeter 116, social media threat monitor unit 104 may identify the geotag metadata as identifier 112 and may form association 130 between the user who generated the post and entity 114. In some examples, if geotag metadata of a particular post 150 indicates that the particular post was generated within a location bounded by perimeter 116, and the post includes one or more keywords 110, a report may be sent to entity 114 and/or a person associated with entity 114. In some examples, reports may be related to social media posts which include keywords 110 and/or identifiers 112. Reports may be sent to computing device 140.

In some examples, social media threat monitor unit 104 may be effective to determine an affiliation between user 118 and a different user 119. For example, association 130 may exist between user 118 and entity 114. User 118 may generate post a message for social media server 122 which includes a particular keyword 110. For example, the first user 118 may generate a post which reads: "I'm going to bring my new handgun to Whizkids on Friday". User 119 may respond to the post: "Me too!". Social media threat monitor unit 104 may determine that there is an affiliation between user 118 and user 119 based on the post of user 119. Social media threat monitor unit 104 may be effective to form association 130 between user 119 and entity 114 in response to the determination that there is an affiliation between user 118 and user 119. Social media threat monitor unit 104 may thereafter monitor posts 152 of user 119 for keywords 110. As will be discussed in further detail below, if a post which includes one or more keywords 110 is sent by a user with a particular association 130 to entity 114, social media threat monitor unit 104 may generate a report. Affiliations between users 118, 119 may be stored in database 108.

Figure 2:
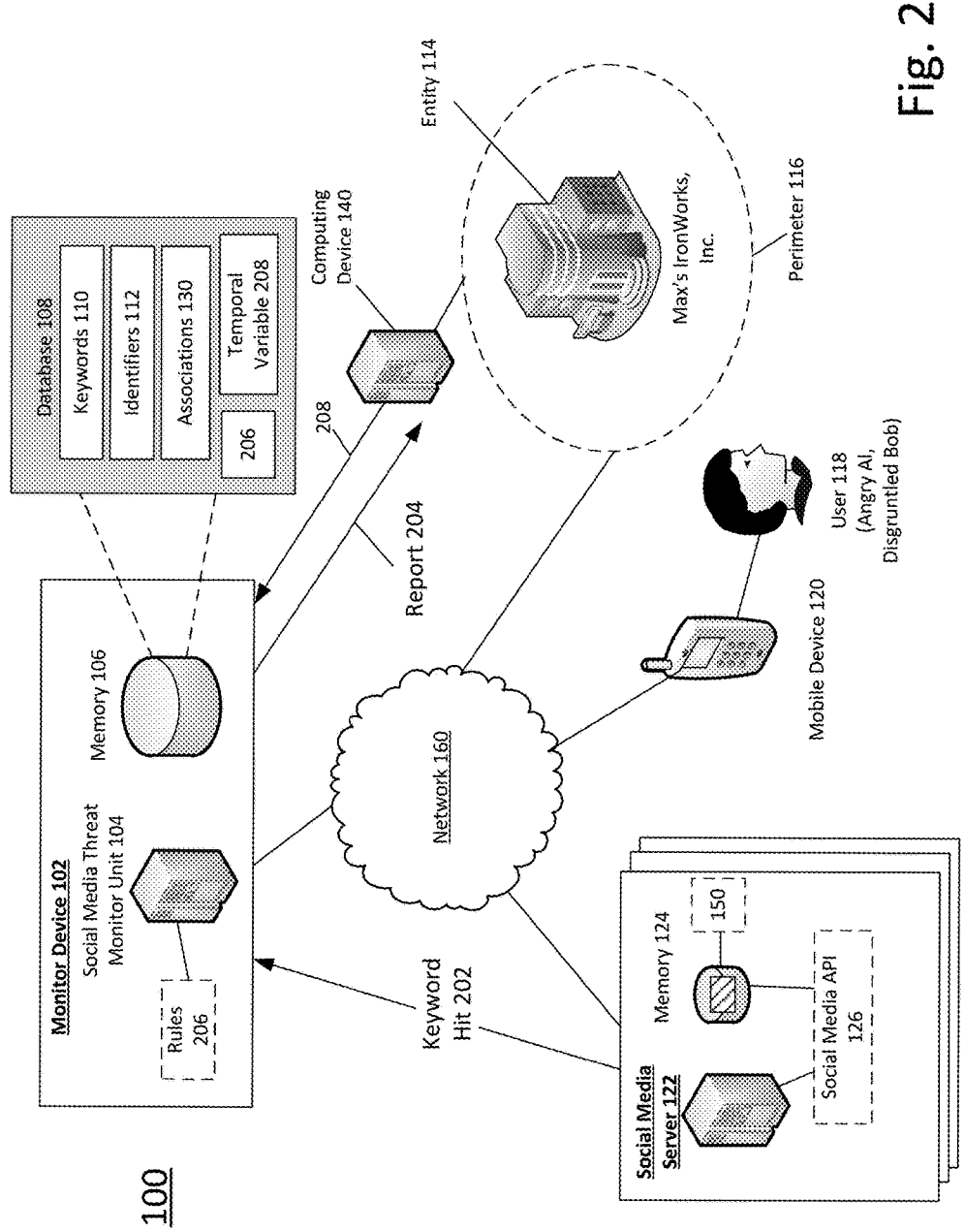
FIG. 2 illustrates another example system that can be utilized to implement a social media threat monitor.

FIG. 2 illustrates another example system that can be utilized to implement a social media threat monitor, arranged in accordance with at least some embodiments described herein. Those components in FIG. 2 which are labeled identically to components described above with reference to FIG. 1 will not be described again for purposes of clarity and brevity.

In an example, entity 114 may be a building associated with a company: Max's IronWorks, Inc. An officer of Max's IronWorks, Inc. may use computing device 140 to provide a list of past and present employees to monitor device 102. The list may include people whom the officer wishes to be associated with entity 114 via associations 130. An employee of Max's IronWorks, Inc., Disgruntled Bob, may be among the employees on the list. Therefore, Disgruntled Bob (and/or Disgruntled Bob's social media accounts) may be associated with entity 114 by association 130. Social media threat monitor unit 104 may store information related to Disgruntled Bob, his social media accounts, affiliations with other social media users, and association 130 with entity 114 in database 108.

The officer of Max's IronWorks may use computing device 140 to send a list of keywords 110 and identifiers 112 to monitor device 102. Identifiers 112 may include the street address of Max's IronWorks offices, the name of the building in which the offices are located, the terms "work", "job", "iron plant", "smelter", "Max's", etc. Keywords 110 may include terms such as: "kill", "bomb", "gun", "steal", or other terms of interest to the officer of Max's IronWorks, Inc.

Monitor device 102 may monitor posts 150 of Disgruntled Bob for the occurrence of keywords 110, as Disgruntled Bob is associated with Max's IronWorks, Inc. by association 130. Monitor device 102 may generate report 204 when a particular post 150 which was generated by Disgruntled Bob includes one or more keywords 110.

In another example, Angry Al may be a customer of Max's IronWorks, Inc. Initially, Angry Al may be unassociated with Max's IronWorks, Inc. via any of associations 130. Angry Al may generate a social media post which reads: "I'm sick of this. Taking my gun to Max's and settling the score!" Monitor device 102 may identify the identifier "Max's" in the social media post. As a result, monitor device 102 may form an association 130 between Angry Al and Max's IronWorks, Inc. Monitor device 102 may identify the keyword "gun" in the social media post. Monitor device 102 may generate a report as a keyword has been identified in a social media post generated by a user associated with Max's IronWorks, Inc. Monitor device 102 may send the report to computing device 140.

In some examples, associations 130 between users 118 and entity 114 may expire after an amount of time. In some examples, such amounts of time may be defined by a temporal variable 208. Temporal variable 208 may be received by monitor device 102 from computing device 140. A particular association 130 between a particular user 118 and a particular entity 114 may persist for an amount of time defined by temporal variable 208. For example, a first post 150 from user 118 may include one or more identifiers 112 and may be identified at a first time. Social media threat monitor unit 104 may form association 130 at the first time. Thereafter, at a second time, user 118 may generate a second social media post which includes one or more keywords 110. Social media threat monitor unit 104 may determine whether the difference between the first time and the second time is less than the amount of time defined by temporal variable 208. If social media threat monitor unit 104 determines that the difference between the first time and the second time is less than the amount of time defined by temporal variable 208, social media threat monitor unit 104 may determine whether or not the second post includes one or more keywords 110.

In another example, if entity 114 represents a university, temporal variable 208 may define a period of time equal to four years, as four years may be the average time of matriculation for a student at the university. Upon enrollment at the university, an indication of association 130 between user 118 and the university (entity 114) may be provided to social media threat monitor unit 104 by computing device 140. Social media threat monitor unit 104 may also infer association 130 between user 118 and the university. For example, if user 118 generates a post on a monitored social media website which reads: "Going to class at Whizkids University", and the term "Whizkids" is among identifiers 112, social media threat monitor unit 104 may form association 130 between user 118 and Whizkids University. Thereafter, if user 118 generates a particular post 150 which includes one or more keywords 110, social media threat monitor unit 104 may generate a report 204 if the particular post 150 was generated before the expiration of temporal variable 208. If no association 130 exists between user 118 and entity 114, either by reason of the expiration of temporal variable 208, or by reason of no identifiers 112 being detected in posts of user 118, report 204 may not be generated.

In some examples, report 204 may include the particular post 150 which may have triggered the particular report. In some other examples, report 204 may include the triggering post 150 as well as other posts 150 from the particular user 118. In some examples, report 204 may include a recommended action or response based on the particular keyword 110 identified in the particular triggering post 150.

In various examples, social media threat monitor unit 104 may prioritize keywords 110 according to rules 206. Rules 206 may rank or prioritize keywords 110. For example, entity 114 may want to know immediately if any user 118 with an association 130 to entity 114 generates a post which includes the keyword "bomb" within 24 hours of a sporting event to be held at a location associated with entity 114. Accordingly, if an associated user 118 generates post 150 which says: "Taking a bomb to the game", social media threat monitor unit 104 may generate and immediately send report 204 to entity 114. In some other examples, upon the occurrence of keywords 110 with a lower rank or priority level, reports 204 may be sent with bi-daily, daily, bi-weekly, weekly, or some other frequency. In various other examples, rules 206 may prioritize reports 204 based on how recently a particular post 150 which includes a keyword was generated.

Figure 3:
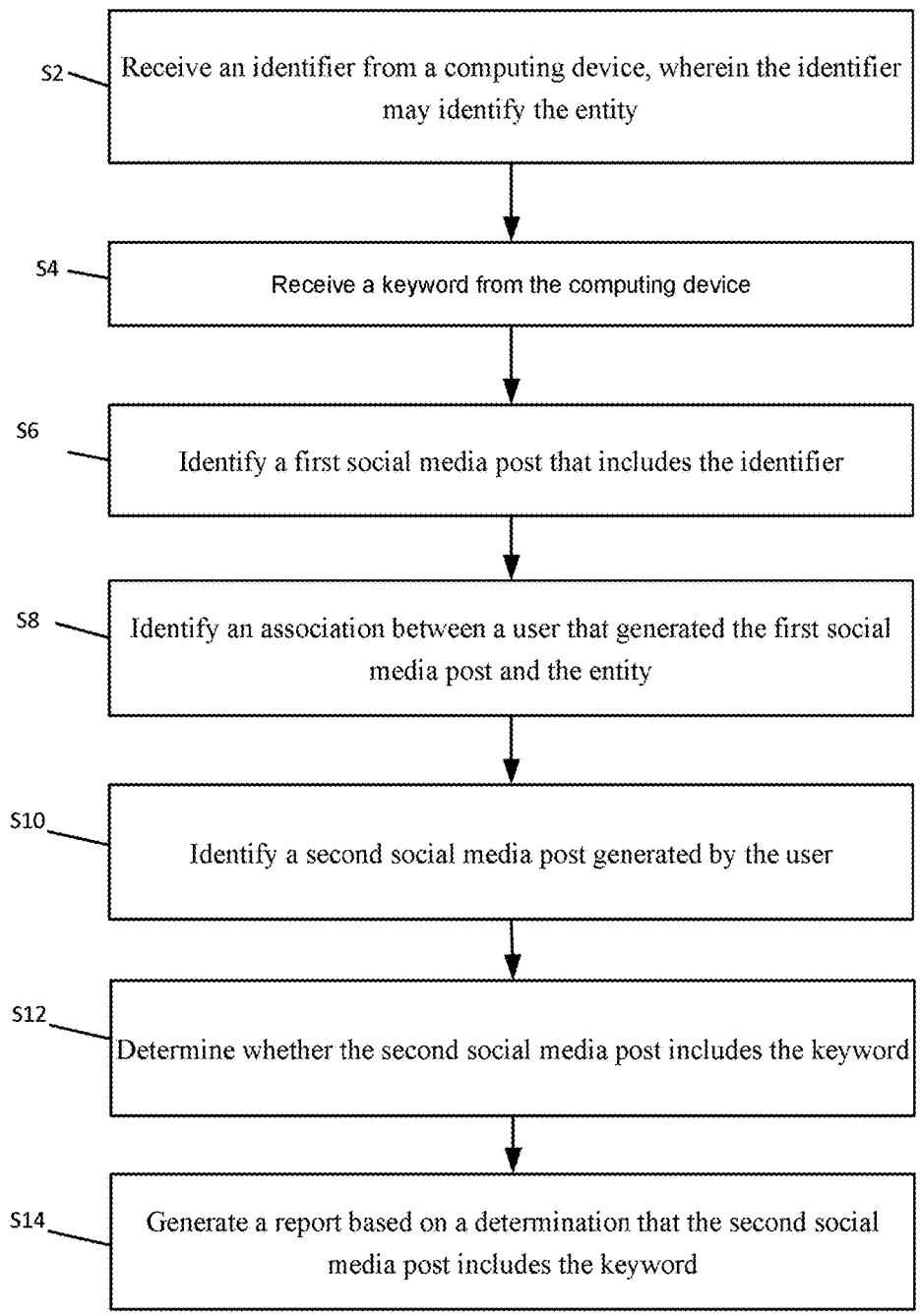
FIG. 3 depicts a flow diagram for an example process to implement a social media threat monitor.

FIG. 3 depicts a flow diagram for an example process to monitor social media using a social media threat monitor, arranged in accordance with at least some embodiments described herein. In some examples, the process in FIG. 3 could be implemented using monitor device 102 and/or computing device 140 discussed above.

An example process may include one or more operations, actions, or functions as illustrated by one or more blocks S2, S4, S6, S8 and/or S10. Although illustrated as discrete blocks, various blocks may be divided into additional blocks, combined into fewer blocks, or eliminated, depending on the desired implementations.

Processing may begin at block S2, "Receive an identifier from a computing device, where the computing device may be related to the entity and the identifier may identify the entity." At block S2, monitor device 102 may receive one or more identifiers 112 from computing device 140. In some examples, the identifier may include at least one of a name, an address, or a location of the entity.

Processing may proceed from block S2 to block S4, "Receive a keyword from the computing device." At block S4, monitor device 102 may receive keywords 110 from computing device 140. In various examples, the keyword may relate to a threat or risk to the entity.

Processing may proceed from block S4 to block S6, "Identify a first social media post that includes the identifier." At block S6, post 150 may be identified which may include one or more identifiers 112. In some examples, social media threat monitor unit 104 may be effective to determine that post 150 includes one or more identifiers 112.

Processing may proceed from block S6 to block S8, "Identify an association between a user that generated the first social media post and the entity." At block S8, an association may be identified between a user, such as user 118 or user 119 and an entity, such as entity 114. In some examples, an indication of the association may be received from computing device 140 and/or entity 114. In some examples, the user may be a first user and the association may be a first association. An affiliation may be determined between the first user (such as user 118) and a second user (such as user 119) different from the first user. A second association may be formed between the second user and entity 114 in response to the determination of the affiliation. A third social media post generated by the second user may be identified and a determination may be made as to whether the third social media post includes the keyword. If the third social media post includes the keyword, a second report may be generated. The second report may be sent to computing device 140 and/or entity 114.

Processing may proceed from block S8 to block S10, "Identify a second social media post generated by the user." At block S10, a second social media post (such as a second post 150) may be generated by the user (such as user 118 or user 119).

Processing may proceed from block S10 to block S12, "Determine whether the second social media post includes the keyword." At block S12, a determination may be made as to whether the second social media post includes the keyword. In some examples, monitor device 102 may receive temporal variable 208 from computing device 140. The first social media post may be identified at a first time that may be prior to the identification of the second social media post. The temporal variable may indicate an amount of time until expiration of the association. The determination that the second social media post includes the keyword may occur at a second time. The difference between the second time and the first time may be less than the amount of time.

Processing may proceed from block S12 to block S14, "Generate a report based on a determination that the second social media post includes the keyword." At block S14, a report may be generated based on a determination that the second social media post includes the keyword, such as keyword 110. In various examples, the report may be related to the second social media post and/or the user. In some examples, the report may be sent to computing device 140 and/or to entity 114. In some examples, the report may recommend an action based at least in part on the particular keyword.

Among other potential benefits, a system in accordance with the disclosure may allow potential threats or other activities of interest to a particular entity to be identified. A monitor system in accordance with the disclosure may identify associations between particular users of social media and particular entities. In some examples, the associations may expire after an amount of time which the entity deems to be significant to the particular association between a user and the entity. During the time period in which a user is associated with an entity, social media posts of the user may be monitored for particular keywords which may be of interest to the particular entity. The monitor system may be able to identify and/or hone in on posts related to activities of greatest interest or concern to the entity, by limiting keyword searches to the posts of associated users. Additionally, the number of search results returned from such a monitor system may be greatly reduced, as only the social media posts of users with an association to an entity of interest will be monitored. Such a reduction in search results may reduce "information overload" and may limit the results returned to those of greatest interest to a particular entity or institution.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to generate a report related to an entity, the method comprising:
   receiving an identifier from a computing device, wherein the identifier identifies the entity, and the entity is associated with one or more locations;
   receiving a keyword from the computing device, wherein the keyword relates to a physical threat to the entity within a perimeter that encloses a physical area surrounding the one or more locations associated with the entity;
   identifying a first social media post that includes the identifier;
   identifying an association between a user that generated the first social media post and the entity;
   identifying a second social media post generated by the user;
   determining whether the second social media post includes the keyword; and
   based on a determination that the second social media post includes the keyword, generating a report to be output to the computing device.

2. The method of claim 1, further comprising receiving an indication of the association from the computing device.

3. The method of claim 1, wherein the identifier includes at least one of a name, an address, or a location for the entity.

4. The method of claim 1, wherein the report is related to the second social media post and/or the user, and wherein the method further comprises sending the report to the computing device.

5. The method of claim 1, further comprising:
   receiving a temporal variable from the computing device, wherein the first social media post is identified at a first time that is prior to the identification of the second social media post, and wherein the temporal variable indicates an amount of time until expiration of the association; and
   wherein the determination that the second social media post includes the keyword occurs at a second time, wherein the difference between the second time and the first time is less than the amount of time.

6. The method of claim 1, wherein the user is a first user and the association is a first association, the method further comprising:
   determining an affiliation between the first user and a second user different from the first user;
   forming a second association between the second user and the entity in response to the determination of the affiliation;
   identifying a third social media post generated by the second user; and
   determining whether the third social media post includes the keyword.

7. The method of claim 6, wherein the report is a first report, and the method further comprising, based on a determination that the third social media post includes the keyword, generating a second report; and
   sending the first report and the second report to the computing device.

8. The method of claim 1, further comprising identifying the association based on geotag metadata included within the first social media post.

9. A monitor device comprising:
   a social media threat monitor unit; and
   a memory effective to be in communication with the social media threat monitor unit;
   the social media threat monitor unit effective to:
      receive an identifier from a computing device, wherein the computing device is related to an entity, the identifier identifies the entity, and the entity is associated with one or more locations;
      receive a keyword from a computing device, wherein the keyword relates a physical threat to the entity within a perimeter that encloses a physical area surrounding the one or more locations associated with the entity;
      identify a first social media post that includes the identifier;
      identify an association between a user that generated the first social media post and the entity;
   the memory effective to store the keyword, the identifier, and the association in a database;
   the social media threat monitor unit further effective to:
      identify a second social media post generated by the user;
      determine whether the second social media post includes the keyword; and
      based on a determination that the second social media post includes the keyword, generate a report to be output to the computing device.

10. The monitor device of claim 9, wherein the social media threat monitor unit is further effective to:
    receive an indication of the association from the computing device; and
    store the indication of the association in the database.

11. The monitor device of claim 9, wherein the identifier includes at least one of a name, an address, or a location for the entity.

12. The monitor device of claim 9, wherein the social media threat monitor unit is further effective to:
    receive a temporal variable from the computing device, wherein the first social media post is identified at a first time that is prior to the identification of the second social media post, and wherein the temporal variable indicates an amount of time until expiration of the association; and
    wherein the determination that the second social media post includes the keyword occurs at a second time, wherein the difference between the second time and the first time is less than the amount of time.

13. The monitor device of claim 9, wherein the user is a first user and the association is a first association, the social media threat monitor unit further being effective to:
    determine an affiliation between the first user and a second user different from the first user;
    form a second association between the second user and the entity in response to the determination of the affiliation;
    identify a third social media post generated by the second user; and
    determine whether the third social media post includes the keyword.

14. The monitor device of claim 13, wherein the report is a first report, and the social media threat monitor unit is further effective to:

based on a determination that the third social media post includes the keyword, generate a second report; and send the first report and the second report to the computing device.

15. A social media monitor system comprising:
a social media threat monitor unit;
a memory effective to be in communication with the social media threat monitor unit; and
a computing device related to an entity associated with one or more locations, the computing device effective to be in communication with the social media threat monitor unit;
the computing device effective to:
   send an identifier to the social media threat monitor unit, wherein the identifier identifies the entity; and
   send a keyword to the social media threat monitor unit, wherein the keyword relates to a physical threat to the entity within a perimeter that encloses a physical area surrounding the one or more locations associated with the entity;
the social media threat monitor unit effective to:
   receive the identifier from the computing device;
   receive the keyword from the computing device;
   identify a first social media post that includes the identifier; and
   identify an association between a user that generated the first social media post and the entity;
the memory effective to store the keyword, the identifier, and the association in a database;
the social media threat monitor unit further effective to:
   identify a second social media post generated by the user;
   determine whether the second social media post includes the keyword;
   based on a determination that the second social media post includes the keyword, generate a report; and
   send the report to the computing device.

16. The social media monitor system of claim 15, wherein:
   the first social media post includes geotag metadata; and
   the geotag metadata indicates that the first social media post was generated within the perimeter, wherein the identification of the association between the user that generated the first social media post and the entity is based on a determination that the first social media post was generated within the perimeter.

17. The social media monitor system of claim 15, wherein the computing device is further effective to:
   send an indication of the association to the social media threat monitor unit; and
   wherein the social media threat monitor unit is further effective to store the indication of the association in the database.

18. The social media monitor system of claim 15, wherein the computing device is further effective to:
   send a temporal variable to the social media threat monitor unit, wherein the first social media post is identified at a first time that is prior to the identification of the second social media post, and wherein the temporal variable indicates an amount of time until expiration of the association; and
   wherein the determination that the second social media post includes the keyword occurs at a second time, wherein the difference between the second time and the first time is less than the amount of time.

* * * * *